Figure 2A:
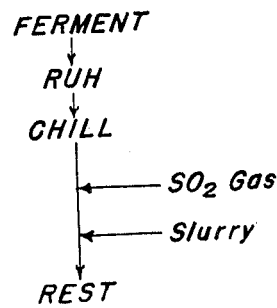

Dec. 8, 1959 — R. G. SHALER ET AL — 2,916,377
PROCESS FOR TREATING BEER
Filed Feb. 4, 1958 — 2 Sheets-Sheet 1

Fig. 1.

FERMENT
↓ ← Slurry of Clay (Enyzme Optional)
↓ ← $SO_2$ Gas
↓
RUH
↓ ← (Optional: Enyzme)
↓
FINISH
↓

Fig. 1A.

FERMENT
↓ ← $SO_2$ GAS
↓ ← Slurry of Clay (Enyzme Optional)
↓
RUH
↓
FINISH
↓

Fig. 2.

FERMENT
↓
RUH
↓
CHILL
↓ ← Slurry of Clay (Enyzme Optional)
↓ ← $SO_2$ Gas
↓
REST
↓
FINISH
↓

INVENTORS
RICHARD G. SHALER
RAYMOND L. McADAM
MARCEL J. BAALMANN
BY Townsend and Townsend
ATTORNEYS Dec. 8, 1959  R. G. SHALER ET AL  2,916,377
PROCESS FOR TREATING BEER
Filed Feb. 4, 1958  2 Sheets-Sheet 2

INVENTORS
RICHARD G. SHALER
RAYMOND L. McADAM
BY MARCEL J. BAALMANN

Townsend and Townsend
ATTORNEYS

2,916,377

PROCESS FOR TREATING BEER

Richard G. Shaler, Raymond L. McAdam, and Marcel J. Baalmann, San Francisco, Calif., assignors to American Tansul Company, San Francisco, Calif., a corporation of California Application February 4, 1958, Serial No. 713,116

4 Claims. (Cl. 99—39)

This invention relates to a new and improved process for treating beer with gaseous $SO_2$. Reference is made to our patent application Ser. No. 602,104, filed August 6, 1956, for "Process for Treating Beer," now abandoned, of which the present invention is a continuation-in-part.

More particularly, we preferably treat beer with a colloidal clay of the montmorillonite family, a proteolytic enzyme and a reducing agent. The purpose of the treatment is to improve the appearance and foaming characteristics of the beer and to prevent the formation of haze upon repeated chilling of the beer or after agitation during transportation. The function of the clay is to remove certain of the heavier protein molecules in the beer by adsorption. The function of the enzyme is to digest others of the proteins in the beer. We have found that $SO_2$ gas added to the beer at an appropriate time in the brewing process improves the flocculation of the stabilizer clay without altering the taste of the beverage. In certain of the examples of the use of the invention hereinafter set forth, the stabilizer is allowed to settle out of the beer, and the beer is then decanted. In such process an important function of the $SO_2$ is the agglomeration or precipitation of the stabilizer into a compact sludge. The compacting of the sludge reduces the quantity of beer entrapped therein and thereby improves the yield of treatment. In such instances, where filtration is employed to remove the saibilizer, the $SO_2$ results in a more compact and grainlike particle which is more readily filtered, and thus reduces the amount of work done by filters.

Another and very important function of the $SO_2$ is as a reducing agent. $SO_2$ gas has been used for certain purposes—as a preservative for fruits and vegetables, as a disinfectant and as a bleaching agent. In all such uses, the quantity of $SO_2$ is in excess of 100 parts per million. In concentrations less than that amount, $SO_2$ has little, if any, bactericidal or bacteriostatic properties and does not function adequately as a preservative, disinfectant or bleaching agent. We have found that, by employing $SO_2$ gas within the range of 5 to 20 parts per million, and preferably between 10 and 15 parts per million—in any event, well below the concentration heretofore employed—highly satisfactory beer treatment results. In such concentrations flocculation and agglomeration of the stabilizer are readily accomplished without affecting the taste of the beverage. At the same time the $SO_2$ performs another important function, namely, as an oxygen scavenger.

Accordingly, one of the principal features of the present invention is the employment of $SO_2$ gas in beer as a flocculating and oxygen-scavenging agent in the range of concentration of between 5 and 20 parts per million, and preferably in the range of 10 to 15 parts per million.

In ordinary brewery practice about 150 parts per million air is dissolved in the beer, which is the equivalent of approximately 30 parts per million dissolved $O_2$. The range of addition of $SO_2$ heretofore described is sufficient to reduce the $O_2$.

Another function of the $SO_2$ gas relates to the use of proteolytic enzyme as hereinafter more fully set forth. Where such proteolytic enzyme is employed, there is frequently an oxygen-protein compound formed in the processing of the beer. The use of $SO_2$ gas releases the proteins so that they may be acted upon by the enzyme. Here again, very small quantities of $SO_2$ gas, within the range heretofore set forth, accomplish this result.

The nature of the present improvement is emphasized when it is understood that heretofore the reducing agent has been provided in the form of a liquid or dry material, such as sodium or potassium metabisulfite. Accordingly, another feature of the invention is the fact that no sodium or potassium or other foreign substance is added to the beer along with the active sulfur dioxide as is the case with sodium or potassium bisulfite or metabisulfite.

Further, the present invention enables more economical and better controlled production of beer than heretofore.

Still another object of the present invention is more accurate control of the amount of sulfur dioxide reducing agent than is possible when another form of reducing agent is employed, by reason of the fact that valving of the gas is readily accurately controlled.

A further advantage of the invention is that taste of the beverage is not appreciably altered by practice of this invention.

An additional feature of the invention is that peroxides are not introduced into the beer, whereas in the case of many deoxidants peroxides are produced, which are deoxidized to sulphate ions. Hence the present invention has advantage over organic scavengers such as ascorbic acid, sodium ascorbate and similar conventional deoxidizers.

The time of addition of the $SO_2$ gas in the beer-processing sequence is subject to considerable variation, as illustrated by the examples hereinafter set forth. In general, it has been found that the gas may be added to the beer at a time slightly before the addition of the stabilizer, slightly after the addition of the stabilizer, or subsequent to the addition of the stabilizer, at about the time the enzyme is added. It will be understood, however, that the relative sequence of addition of enzyme, stabilizer and $SO_2$ is subject to considerable variation.

Other objects of the present invention will become apparent upon reading the following specification.

Reference is made to the accompanying drawings which illustrate schematically flow sheets of various examples of use of the invention.

A preferred stabilizer is a gel-like colloidal clay of the montmorillonite family, namely, the mineral hectorite. In the practice of this invention it will be understood that the stabilizing agent may be another colloidal clay of the montmorillonite family, including such clays as bentonite, nontronite, saponite, sepiolite, and beidelite and associated clay materials; or the invention may be practiced without a mineral additive wherein the sulfur dioxide is to be used as a precipitant and/or antioxidant. The quantity of hectorite clay employed is in the range of 3 to 10 pounds per 100 barrels.

Various proteolytic enzymes may be employed to enhance the keeping quality and other desired characteristics of beer. A preferred enzyme is a mixture of the enzyme bromelin and the enzyme papain. Bromelin, possesses certain desirable features which are described in Shaler and Baalmann patent application Serial No. 446,892, filed July 30, 1954, entitled "Process for Treating Beer," now abandoned. The quantity of enzyme added is dependent upon the length of time the beer is chilled or stored, the longer the time the less enzyme being required to accomplish the proper digestion. It is desirable that the enzyme be added at least five days before finishing. One preferred enzyme ingredient is 6000 units of enzymatic activity per 100 barrels of beer of bromelin and between 500 and 1500 units of enzymatic activity per 100 barrels of beer of papain.

In accordance with this invention the reducing agent is gaseous sulfur dioxide as commercially obtainable. The gas is metered from 5 to 20 parts per million of beer and preferably between 10 and 15 parts per million of beer.

Examples of the use of $SO_2$ gas in the treatment of beer are hereinafter set forth.

*Example 1*

(See Fig. 1)

An aqueous slurry of stabilizer clay, such as hectorite, and optionally enzyme and water, is injected into a line through which the beer is passing on its way to the ruh tank. At some point along this line, after the stabilizer has been added, gaseous sulfur dioxide is injected into the beer line. The beer is then chilled and left in the ruh tank for a period in excess of six days and even over fifteen days, depending upon the desire of the brewer. A sludge is formed at the bottom of the tank by precipitation of the colloidal suspension of the clay which initially forms in the settling tank. The gel adsorbs the long-chain protein molecules as it settles out, removing them from the beer. At the same time, the enzyme acts to digest some of the other proteins in the beer, which also settle out in the sludge. The sulfur dioxide mixes with the beer and helps to precipitate the hectorite and to form a more compact and grain-like sludge in the settling tank. It further assists the enzyme in digesting the proteins in the beer during settling and also during pasteurization when the enzyme is activated. The sulfur dioxide also reverses some of the oxidation which has taken place in the beer during the fermentation process. However, all of the sulfur dioxide is not lost during the period, but remains in the beer and serves as an anti-oxidant scavenger for many weeks while the beer is in transport or storage prior to consumption and further reduces some of the oxidation which has taken place during the prior steps of manufacture. After the ruh the beer is treated in normal manner. Enzyme may be added after the clay is removed, if it is not added at an earlier stage.

*Example 1A*

(See Fig. 1A)

Instead of adding the gas slightly after the addition of the stabilizer, the gas may be added slightly before the addition of the stabilizer.

It will be understood that, where in the foregoing Examples 1 and 1A it is stated that the stabilizer and/or gaseous $SO_2$ may be added before the ruh, the stabilizer and/or gas may be added when the ruh is only partially accomplished. As used herein, the term "ruh" means the aging or storage period occurring after fermentations.

*Example 2*

(See Fig. 2)

Instead of adding the stabilizer and $SO_2$ gas prior to the ruh, the two ingredients are added after the ruh.

*Example 2A*

(See Fig. 2A)

Instead of adding the gas slightly after the addition of the stabilizer, the gas may be added slightly before the addition of the stabilizer.

*Example 3*

Figure 3:
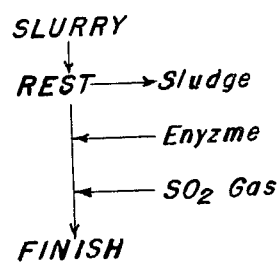

(See Fig. 3)

The stabilizer is added to the beer at some stage prior to the addition of the enzyme and is removed from the beer prior to the time of the addition of the enzyme. Late in the brewing process, the enzyme is added to the beer and the gaseous $SO_2$ is added at a time slightly before, slightly after or contemporaneously with the addition of the enzyme.

*Example 4*

Figure 4:
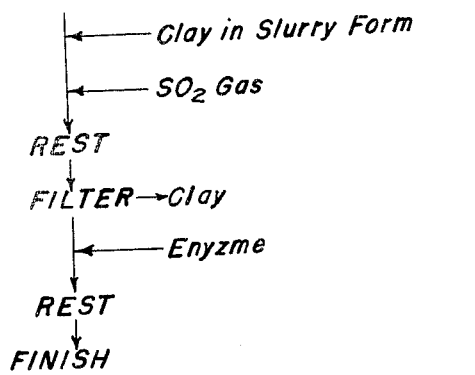

(See Fig. 4)

The beer as it is transferred to a rest tank is treated with the addition of 200 parts per million hectorite and approximately 9 parts per million gaseous $SO_2$. After a short period of time, in the neighborhood of 20 to 30 minutes, when visual flocculation occurs, the beer is passed through a filter either with or without the use of an asbestos material as a pre-coat for the filter cloths and with a coarse grade diatomaceous earth added to the beer during the filtration at the rate of 0.4 part per million. After the filtration is completed, 3100 enzymatic activity units of an enzyme such as bromelin or a mixture of bromelin and papain, in the range of 10 parts bromelin to 1 part papain to 5 parts bromelin to 1 part papain, is proportionately added. Thereupon the beer is transferred to a tank and allowed to rest, after which it is finish-filtered, bottled and pasteurized in accordance with standard brewery procedure.

Although the foregoing invention has been described in some detail, it is understood that certain changes and modifications may be practiced within the spirit of the invention and scope of the appended claims.

What is claimed is:

1. The method of producing beer, which comprises the steps of adding a stabilizer to the beer after fermentation, then adding gaseous sulfur dioxide to the beer and thereafter finishing the beer, the gaseous sulfur dioxide being added to the beer in the proportion of about 5 to 20 parts per million of beer.

2. A method of treatment of beer, which comprises adding to fermented beer a stabilizer and a proteolytic enzyme and subsequently adding pure gaseous sulfur dioxide in the proportion between 5 and 20 parts per million, allowing the beer to stand while the stabilizer settles out and entraps certain protein molecules and the enzyme digests other protein molecules, removing the beer from the sludge, and finishing the beer.

3. The method of treatment of beer, which comprises treating the fermented beer during normal brewery processing with gaseous $SO_2$ in the range of 5 to 20 parts per million, allowing the $SO_2$ to scavenge oxygen in the beer and reduce oxygen-protein compounds to release proteins, digesting the released proteins with proteolytic enzyme, and then completing the brewery processing.

4. The method of treatment of beer, which comprises treating the fermented beer during normal brewery processing with gaseous $SO_2$ in the range of 5 to 20 parts per million, adding to the beer an aqueous slurry of montmorillonite clay, allowing the $SO_2$ to act on the clay to flocculate and agglomerate the clay and to scavenge oxygen in the beer, and then completing the brewery processing.

References Cited in the file of this patent

UNITED STATES PATENTS

| | | |
|---|---|---|
| 1,765,667 | Gusmer | June 24, 1930 |
| 2,291,624 | Heimann et al. | Aug. 4, 1942 |
| 2,416,007 | Joachim | Feb. 18, 1947 |
| 2,433,411 | Wallerstein | Dec. 30, 1947 |
| 2,717,852 | Stone | Sept. 13, 1955 |